No. 718,983. PATENTED JAN. 27, 1903.
G. L. COURSEN.
PHOTOGRAPHIC SHUTTER.
APPLICATION FILED APR. 9, 1902.
NO MODEL. 2 SHEETS—SHEET 1.
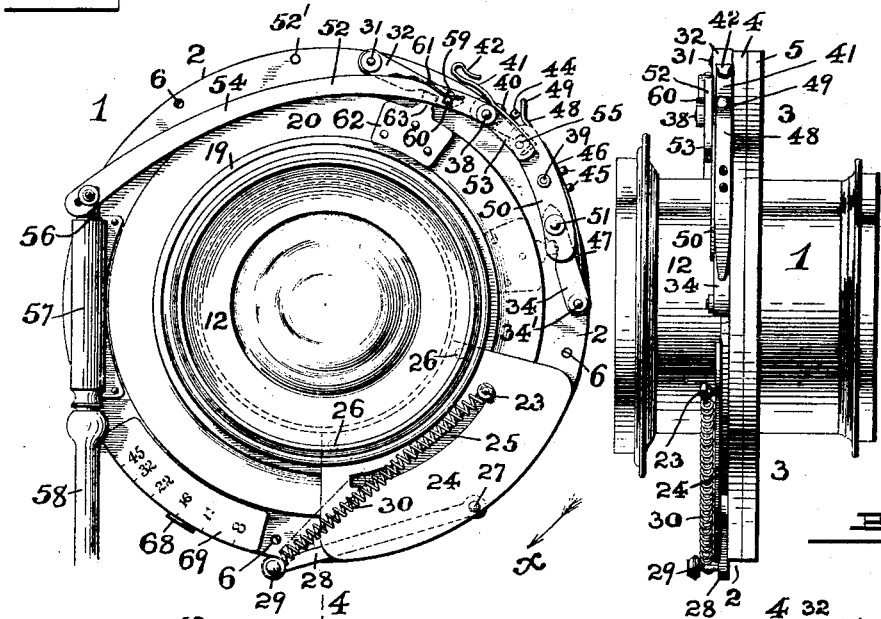
Fig. 1.
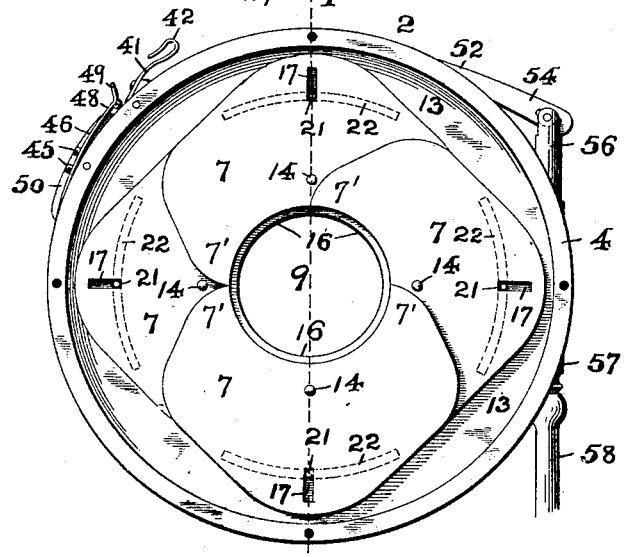
Fig. 3.
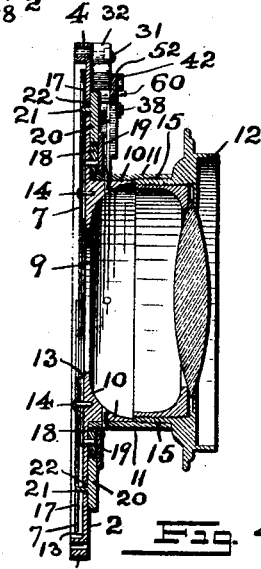
Fig. 2.
Fig. 4.
WITNESSES:
M. B. Fraentzel.
Geo. A. Richards.
INVENTOR:
George L. Coursen
BY
Fred C. Fraentzel,
ATTORNEY
THE NORRIS PETERS CO., PHOTO-LITHO., WASHINGTON, D. C.

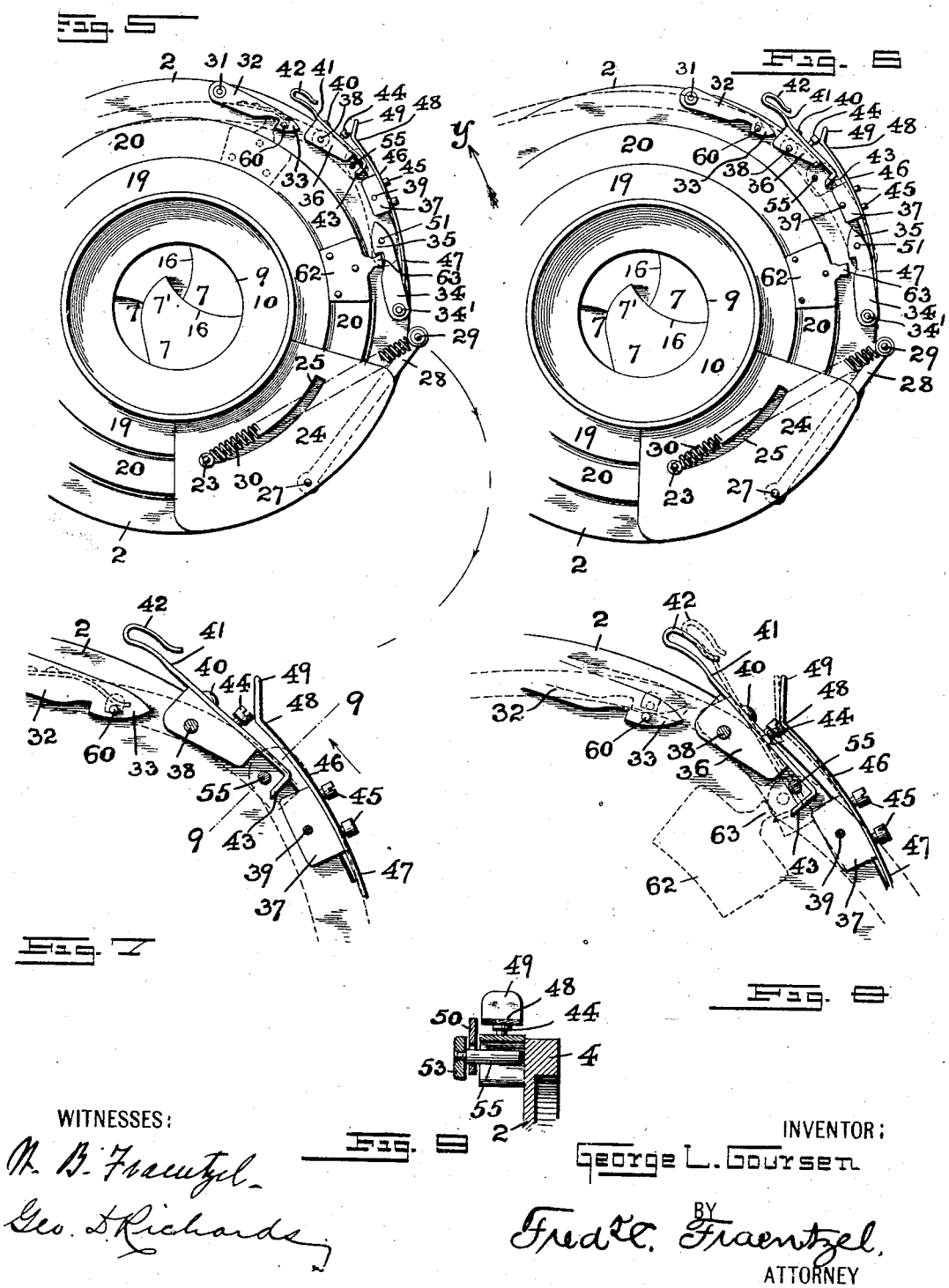

UNITED STATES PATENT OFFICE.

GEORGE L. COURSEN, OF NEWARK, NEW JERSEY.

PHOTOGRAPHIC SHUTTER.

SPECIFICATION forming part of Letters Patent No. 718,983, dated January 27, 1903.

Application filed April 9, 1902. Serial No. 101,987. (No model.)

*To all whom it may concern:*

Be it known that I, GEORGE L. COURSEN, a citizen of the United States, residing at Newark, in the county of Essex and State of New Jersey, have invented certain new and useful Improvements in Photographic Shutters; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention has reference to improvements in that class of photographic shutters which are adapted for both time and instantaneous exposures; and the invention has for its various objects to provide a novel and simply-constructed and efficient mechanism which may be employed for either time or instantaneous exposure, the various parts of the mechanism for actuating the sliding leaves of the shutter proper being such that the leaves can be moved in reverse directions across the opening for exposure in succession at each compression of the bulb, thus being able at each time and during each reverse movement of the leaves in either direction across the opening in the frame of the shutter to take a picture, and that without the further use of an additional bulb for releasing the mechanism to produce such reverse movement of the leaves of the shutter, and, furthermore, dispensing with the use of an additional regulating lever or levers for producing a time or an instantaneous exposure and also dispensing with the use of other independently-operating parts of mechanism now ordinarily employed for producing the results desired.

The present invention therefore consists in the novel construction of photographic shutter hereinafter more fully set forth; and, furthermore, this invention consists in the various novel arrangements and combinations of the parts thereof, all of which will be more particularly described in the following specification, and then finally embodied in the various clauses of the claim.

The invention is clearly illustrated in the accompanying drawings, in which—

Figure 1 is a face or front view of a photographic shutter and a lens, the said shutter embodying the various novel features of my present invention; and Fig. 2 is a side view of the various parts represented in said Fig. 1, the mechanism in both of the said views being set for an instantaneous exposure. Fig. 3 is a rear or back view of the photographic shutter embodying the principles of this invention, the leaves of the shutter being represented in their actuated positions while making a time exposure; and Fig. 4 is a longitudinal vertical section of the said parts, said section being taken on line 4 4 in said Fig. 3. Fig. 5 is a face or front view of my novel form of shutter mechanism with the front lens removed, the leaves of the shutter being represented in their closed positions, with the shutter actuating and releasing mechanism shown in one of its inactive or locked positions and set for making an instantaneous exposure when the bulb is pressed, the main releasing-lever and a link connected therewith, however, being indicated in dotted outline. Fig. 6 is a similar view of the said mechanism with the various parts thereof represented in their released positions and just about to produce the movement of the leaves of the shutter for rapidly opening and closing the opening in the shutter-frame. Figs. 7 and 8 are detail face views, on an enlarged scale, of certain of the parts of the shutter mechanism, the parts in said Fig. 7 being set for an instantaneous exposure and the parts in said Fig. 8 being set for a time exposure. Fig. 9 is a vertical cross-section taken on line 9 9 in said Fig. 7.

Similar characters of reference are employed in all of the said above-described views to indicate corresponding parts.

In the said drawings the reference character 1 indicates the complete photographic attachment or device, the same comprising a pair of frame-sections 2 and 3, the said sections being respectively provided with marginal shoulders 4 and 5, which can be placed upon each other and the two sections then secured together by means of screws, pins, or rivets 6, so as to provide a chambered frame in which are movably arranged the shutter slides or leaves 7 and the slides or leaves of the usual form of iris diaphragm. The said frame-section 2, as will be seen from an inspection of Fig. 4 of the drawings, is made with a central opening 9, which is surrounded by a marginal shoulder 10 of any desirable cross-section. Suitably secured to the outer cylindrical surface of said shoulder 10 is a sleeve 11, provided with an internal screw-thread 15 for the reception of a lens-holding frame 12 of any well-known construction.

Extending from the inner surface 13 of that portion of the frame-section 2 at or near the marginal edge of the central opening 9 is an arrangement of four posts or pins 14, the same being placed in the circumference of an imaginary circle which has its center in the center of the said opening 9, and all the central axes of the said pins or posts 14 are therefore concentric with and equidistant from the marginal edge of the said opening 9. Pivotally arranged upon each pin or post 14 is one of a set of four leaves 7, forming the shutter proper of my invention. Each leaf 7 is preferably of the configuration indicated more particularly in Figs. 3 and 14, each leaf being formed with a curved marginal edge portion 16 and a horn, as 7', at each end of the said marginal edge portion 16, the said marginal edge portion 16 of each leaf being an arc of the same curvature, or approximately so, as the curvature of the circumferential marginal edge of the said opening 9, whereby during the entire time of a time exposure the said opening 9 can be held open to its full extent, while during an instantaneous exposure the said horns 7' pass directly in curved paths over the said opening 9 and for but an instant cause the portions 16 to entirely open the shutter. Each leaf 7 is also made in the opposite portion of the leaf with a slot or opening 17, each opening or slot 17 being placed in alinement with a post or pin 14 and with the imaginary central point of the said opening 9. The slots or openings 17 serve for the purposes to be presently described.

Of course it will be understood that I do not limit myself to the use of four leaves 7 and four pins or posts 14, for I am fully aware that a smaller or a greater number of such shutter-leaves and pins or posts may be employed; but the arrangement of leaves as hereinabove set forth is the preferred form and arrangement.

Referring now to Figs. 1, 4, 5, and 6, it will be seen that I have arranged against the outer face of the frame-section 2, concentric with and in close proximity to the outer surface of the previously-mentioned sleeve 11, a ring 18, the said ring 18 being immovably secured upon the said face of the frame-section 2 in any suitable and well-known manner. Suitably arranged upon the upper face of this ring 18 and immovably held thereon in any well-known manner is another ring 19, which has its outer marginal edge projecting slightly beyond the outer marginal edge of the ring 18, as clearly represented in Fig. 4 of the drawings, so as to provide a suitable holding means, beneath which a portion of a third ring 20 is slidably retained and is capable of an oscillatory movement, substantially as and for the purposes to be presently more fully described. The said ring 20, which I shall hereinafter term the "shutter-ring," is provided with four rearwardly-extending posts or pins 21, which project directly through correspondingly-arranged slots 22 in the body of the frame-section 2, and each pin or post 21 having its free end terminating in a slot 17 of the shutter-leaves 7. The said shutter-ring 20 is also provided on its outer face with an upwardly-projecting post or pin 23, which extends into and is movably arranged in a curved slot 25 of a guide or plate 24. The said guide or plate is suitably arranged in a fixed and immovable position, preferably by means of screws or rivets 26, (indicated in dotted outline in Fig. 1 of the drawings,) directly to the said ring 18. The said plate or guide 24 is also provided with a pivotal post or pin 27, preferably extending from its under side, on which is fulcrumed the one end of an arm 28. The opposite end of said arm 28 is provided with a post or pin 29 or other suitable fastening means, to which is attached the one end of a coiled spring 30. The opposite end of this spring extends directly above the said plate or guide 24, and said end is attached to the end of the said pin or post 23, which projects directly above the said curved slot 25 of the said guide or plate 24. Thus when the shutter-releasing mechanism, to be presently described, is released, the lever or arm 28 having been set in the position indicated in Fig. 1 of the drawings, then the distended coils of the spring 30 will cause the said shutter-ring 20 to slide in the direction of the arrow $x$ of Fig. 1, the movement of the post or pin 23 on said ring 20 being limited to the length of the said slot 25 in said plate 24 and remaining in the position indicated in Figs. 5 and 6. The consequent movement of the said shutter-ring 20 and its pins or posts 21, which, as has been stated, extend directly into the slots 17 of the shutter-leaves 7, will have caused the several leaves to move or slide from their relatively closed position over the opening 9 in the frame-section 2 directly across the said opening, thereby bringing the leaves in their open relation to said opening and then again closing the same, as will be clearly understood. In this manner an instantaneous exposure is produced. In like manner when the position of the arm 28 is reversed, so as to assume the position indicated in Figs. 5 and 6, and the coils of the spring 30 are distended, then upon a similar release of the shutter actuating and releasing mechanism the shutter-ring 20 will move in the reverse direction, (indicated by the arrow $y$ in said Fig. 5.) The opening 9 is thereby again opened and closed for an instantaneous exposure, all the parts being moved in their reverse directions and assuming their former positions indicated in Fig. 1 of the drawings.

Having thus described the general construction of the shutter, as well as the arrangement of the leaves of the shutter, and a means for causing the reverse movements of the shutter-leaves and of the shutter-ring 20, with which said leaves are operatively connected, I will now endeavor to describe the shutter actuating and releasing mechanism.

Pivotally arranged upon a pin or post 31, which extends from the face of the frame-section 2, is a holding dog or latch 32, which is provided with a holding catch or nosing 33. Upon a second pin or post 34', extending from the face of the said frame-section 2, is another holding dog or latch 34, which is provided with a holding catch or nosing 35, the said catch or nosing 25 of the dog or latch 34 extending in a direction toward the holding catch or nosing 33 of the said dog or latch 32. Suitably secured against the face of the frame-section 2 are two blocks or supports 36 and 37, the said block 36 having a slight pivotal movement upon a pin 38 and the block 37 being held in position against the face of the frame-section 2 by a pin 39. Suitably secured upon the outer edge of the said block 36 by means of a screw or rivet 40 or any other means is a plate-like arm 41, which is provided at its one end with a finger-piece 42 and at its other end with a downwardly-extending stud or projection 43 for the purpose of a stop to be used during time exposure in the manner hereinafter set forth. The said plate-like arm 41 is also provided with a suitably-disposed screw or an enlargement 44, which extends slightly above the upper surface of said arm 41, as shown. Secured upon the outer edge of the block 37 by means of screws 45 or in any other manner is a spring 46, the one free end portion 47 of which is in pressing engagement with the pivoted dog or latch 34, so that the normal tendency is to force the holding catch or nosing 35 of said dog or latch 34 in a direction toward the center of the opening 9 in the frame-section 2, while the opposite arm portion 48 of said spring 46 is made with an outwardly-extending and bent end piece 49, which normally rests upon the free end of said screw or enlargement 44, as indicated more particularly in Fig. 7, but which free end of the said screw or enlargement 44 can be slid directly beneath the end of said arm portion 48 of said spring 46 to bring said arm portion 48 from the dotted position indicated in Fig. 8 to the raised position represented in full outline in the same figure. The previously-mentioned pin 39, which holds the block 37 in its position against the face of the frame-section 2, extends slightly above the face of the said block and has fulcrumed thereon a link 50, which has its lower end portion pivotally connected with a post or pin 51, extending from the side of the holding catch or nosing 35 of the holding dog or latch 34. Upon the pivotal pin or post 38 of the block 36 I have fulcrumed a releasing-lever 52, the same comprising a short arm 53 and a long arm 54. The short arm 53 of this lever is operatively connected with the upper end portion of the said link 50 by means of a pin 55. The lower end portion of the long arm 54 of said releasing-lever 52 is operatively connected with the end of a plunger-arm 56, normally arranged in a tube or cylinder 57 and adapted to be forced in an outward or upward direction when air is forced into the lower end of said tube or cylinder 57 through a tube 58, to the free end of which is attached the ordinary rubber compression-bulb. The said long arm 54 of the releasing-lever 52 is also provided with an elongated hole 59, into which projects a pin or projection 60, extending laterally from the side of the holding catch or nosing 33 of the holding dog or latch 32. A spring 61 is suitably secured to the said arm 54 of the releasing-lever 52, the said spring having its free end resting with slight pressure upon the said pin or projection 60, whereby the said releasing-lever 52 and the holding-dog 32 under normal conditions, when there is no air being forced into the tube or cylinder 57, are forced in a downward direction toward the center of the opening in the frame-section 2. Upon the said movable shutter-ring 20, in the proper place, I have secured a plate, as 62, which is provided with a tooth, projection, or stop 63, extending beyond the outer marginal edge of said ring 20, as clearly illustrated in Fig. 1 of the drawings.

The operation of the shutter actuating and releasing mechanism is briefly as follows: Suppose the several parts of the mechanism are in the positions represented in Fig. 1 of the drawings and it is desired to make an instantaneous exposure. When in this position, the tooth, projection, or stop 63 is in holding engagement with the holding catch or nosing 33 of the dog 32, and the arm 28 and spring 30 can be arranged in their operative positions (indicated in said Fig. 1) without actuating the said ring 20. A pressure upon the air-bulb causes the plunger-arm 56 to move upwardly, this movement being sufficient to actuate the releasing-lever 52. The upward motion of the arm portion 54 of said lever 52, which movement is limited by said arm portion coming in contact with a pin or stop 52' on the side of the frame-section 2, raises the holding catch or nosing 33 of the dog 32, whereby the tooth, projection, or stop 63 is also released from its locked or held engagement with said catch or nosing 33. Immediately the spring 30 acts in the manner hereinabove previously described, and the downward movement of the arm portion 53 of the said lever 52, through the link 50, has sufficiently raised the holding catch or nosing 35 of the holding-dog 34 to permit the tooth, projection, or stop 63 to enter directly behind the said nosing 35, as indicated in the dotted outline in Fig. 1 or in Figs. 5 and 6 of the drawings. Thus it will be clearly evident that while with one pressure of the air-bulb the shutter-leaves 7 have rapidly opened and then instantly closed again the various parts of the mechanism are again held in their immovable positions by the locked engagement of the tooth, projection, or stop 63 with the nosing or catch 35 of the other holding-dog 34. After setting the arm 28 and the spring 30 in the manner indicated in said Figs. 5 and 6 the next pressure upon the air-bulb causes the releasing-lever 52 to simultaneously raise the two holding-dogs 34 and 32, whereby the ring 20 and the released tooth or projection 63 are returned to their former positions indicated in Fig. 1, and another instantaneous exposure has been made by the shutter-leaves 7. In this manner the leaves of the shutter can be moved in reverse directions across the opening 9 for successive exposure for each picture desired, and each exposure being made with each compression of the air-bulb, the shutter closing automatically, owing to the arrangement and construction of the variously-arranged movable parts of the mechanism. When it is desired to make a time exposure by setting the plate-like arm 41 by means of its finger-piece 42 in the raised dotted position indicated in Fig. 8, the screw or projection 44 is forced in frictional engagement with the under surface of the arm portion 48 of the spring 46, as shown. The block 36 is thereby slightly tilted upon its pivotal pin, and the stop or projection 43 of said arm 41 is brought directly into the path of the said tooth, projection, or stop 63, which extends from the ring 20. Thus when the bulb is compressed this tooth, projection, or stop 63 moves directly against the said stop 43, as indicated in the dotted outline in said Fig. 8, and in this engaged or held position it can be retained as long as desired by keeping the bulb compressed. When in this position, the leaves 7 of the shutter hold open the entire space across the opening 9, as represented in Fig. 3, and the time exposure takes place. As soon as the operator removes the pressure from the bulb then the releasing lever automatically returns to its normally inactive position, and the stop 43 is caused to move away from its holding engagement with the said tooth, projection, or stop 63. The tension of the distended coils of the spring 30 then cause the said ring 20 to complete its interrupted movement, whereby the leaves of the shutter will again be brought in their closed relation over the opening 9, and the stop, tooth, or projection 63 is also brought into its holding or locked engagement with the holding-dog at the end of the said movement. The reverse movements of these parts of the mechanism during a second time exposure is the same as that hereinabove described in connection with the first time exposure.

In connection with my novel construction of shutter and the mechanism for actuating and releasing the same I may use the ordinary form of iris diaphragm.

I am fully aware that various changes may be made in the arrangements and combinations of the devices, as well as in the parts and the details of the construction thereof, without departing from the scope of my present invention. Hence I do not limit my invention to the exact arrangements and combinations of the said devices and their parts as described in the foregoing specification and as illustrated in the accompanying drawings, nor do I confine myself to the exact details of the construction of the said parts.

Having thus described my invention, what I claim is—

1. In a photographic shutter, the combination, with a chambered frame-section provided with a circular opening, of a series of shutter-leaves assembled around said opening, each leaf having a pivotal center on an imaginary circle concentric with the circular opening in said frame-section, and means for actuating the shutter-leaves successively in reverse directions to make an exposure during each movement, substantially as and for the purposes set forth.

2. In a photographic shutter, the combination, with a chambered frame-section provided with a circular opening, of a series of shutter-leaves assembled around said opening, each leaf having a pivotal center on an imaginary circle concentric with the circular opening in said frame-section, and a spring-actuated means for actuating the shutter-leaves successively in reverse directions to make an exposure during each movement, substantially as and for the purposes set forth.

3. In a photographic shutter, the combination, with a chambered frame-section provided with a circular opening, of a series of shutter-leaves assembled around said opening, each leaf having a pivotal center on an imaginary circle concentric with the circular opening in said frame-section, and a movable ring with which the leaves of the shutter are operatively connected, and means for sliding the said ring successively in reverse directions to make an exposure during each movement, substantially as and for the purposes set forth.

4. In a photographic shutter, the combination, with a chambered frame-section provided with a circular opening, of a series of shutter-leaves assembled around said opening, each leaf having a pivotal center on an imaginary circle concentric with the circular opening in said frame-section, and a movable ring with which the leaves of the shutter are operatively connected, and a spring-actuated means for sliding the said ring successively in reverse directions to make an exposure during each movement, substantially as and for the purposes set forth.

5. In a photographic shutter, the combination, with a frame-section, and a shutter proper arranged in said frame-section, of a movable ring on said frame-section with which the leaves of the said shutter are operatively connected, a slotted plate connected with the said frame-section beneath the slotted portion of which plate the said ring is slidably arranged, a post on said ring extending into and through the slot in said plate, a pivotally-arranged arm, and a spring connecting the said arm with the said post on said ring, and a releasing mechanism connected with said ring to retain said ring in its normally immovable position, but said mechanism being adapted to release said ring from its normally immovable position and cause said spring to actuate the said ring, substantially as and for the purposes set forth.

6. In a photographic shutter, the combination, with a frame-section, and a shutter proper arranged in said frame-section, of a movable ring on said frame-section with which the leaves of the said shutter are operatively connected, a slotted plate connected with the said frame-section beneath the slotted portion of which plate the said ring is slidably arranged, a post on said ring extending into and through the slot in said plate, a pivotally-arranged arm, and a spring connecting the said arm with the said post on said ring, and a releasing mechanism connected with said ring to retain said ring in its normally immovable position, but said mechanism being adapted to release said ring from its normally immovable position and cause said spring to actuate the said ring, consisting, essentially, of a holding-tooth extending laterally from the said ring, a pair of holding-dogs pivotally arranged on said frame-section with either of which the said holding-tooth can be successively brought in holding engagement, and a releasing-lever coöperating with the said holding-dogs for releasing the said holding-tooth from one holding-dog and permitting its locked engagement with the other holding-dog, substantially as and for the purposes set forth.

7. In a photographic shutter, the combination, with a frame-section, and a shutter proper arranged in said frame-section, of a movable ring on said frame-section with which the leaves of the said shutter are operatively connected, a slotted plate connected with said frame-section beneath the slotted portion of which plate the said ring is slidably arranged, a post on said ring extending into and through the slot in said plate, a pivotally-arranged arm, and a spring connecting the said arm with said post on said ring, a releasing mechanism connected with said ring to retain said ring in its immovable position, but said mechanism being adapted to release said ring from its normally immovable position and cause said spring to actuate the said ring for an instantaneous exposure, and an intermediately-placed means adapted to arrest the movement of said ring for a time exposure, substantially as and for the purposes set forth.

8. In a photographic shutter, the combination, with a frame-section, and a shutter proper arranged in said frame-section, of a movable ring on said frame-section with which the leaves of the said shutter are operatively connected, a slotted plate connected with said frame-section beneath the slotted portion of which plate the said ring is slidably arranged, a post on said ring extending into and through the slot in said plate, a pivotally-arranged arm, and a spring connecting the said arm with said post on said ring, a releasing mechanism connected with said ring to retain said ring in its immovable position, but said mechanism being adapted to release said ring from its normally immovable position and cause said spring to actuate the said ring for an instantaneous exposure, consisting, essentially, of a holding-tooth extending laterally from the said ring, a pair of holding-dogs pivotally arranged on said frame-section with either of which the said holding-tooth can be successively brought in holding engagement, a releasing-lever coöperating with the said holding-dogs for releasing the said holding-tooth from one holding-dog and permitting its locked engagement with the other holding-dog, and a spring-stop on said frame-section located between the said holding-dogs and adapted to be forced directly in the path of the said holding-tooth for engagement therewith for a time exposure, substantially as and for the purposes set forth.

9. In a photographic shutter, the combination, with a frame-section, and a shutter proper arranged in said frame-section, of a movable ring on said frame-section with which the leaves of the said shutter are operatively connected, a slotted plate connected with said frame-section beneath the slotted portion of which plate the said ring is slidably arranged, a post on said ring extending into and through the slot in said plate, a pivotally-arranged arm, and a spring connecting the said arm with said post on said ring, a releasing mechanism connected with said ring to retain said ring in its immovable position, but said mechanism being adapted to release said ring from its normally immovable position and cause said spring to actuate the said ring for an instantaneous exposure, consisting, essentially, of a holding-tooth extending laterally from the said ring, a pair of holding-dogs pivotally arranged on said frame-section with either of which the said holding-tooth can be successively brought in holding engagement, a releasing-lever connected with one of the said holding-dogs, and an oscillating link connected at its respective ends with the other holding-dog and with the said releasing-lever, all coöperating with the said holding-dogs to release the said holding-tooth from one holding-dog and permitting its locked engagement with the other holding-dog, substantially as and for the purposes set forth.

10. In a photographic shutter, the combination, with a frame-section, and a shutter proper arranged in said frame-section, of a movable ring on said frame-section with which the leaves of the said shutter are operatively connected, a slotted plate connected with said frame-section beneath the slotted portion of which plate the said ring is slidably arranged, a post on said ring extending into and through the slot in said plate, a pivotally-arranged arm, and a spring connecting the said arm with said post on said ring, a releasing mechanism connected with said ring to retain said ring in its immovable position, but said mechanism being adapted to release said ring from its normally immovable position and cause said spring to actuate the said ring for an instantaneous exposure, consisting, essentially, of a holding-tooth extending laterally from the said ring, a pair of holding-dogs pivotally arranged on said frame-section with either of which the said holding-tooth can be successively brought in holding engagement, a releasing-lever connected with one of the said holding-dogs, and an oscillating link connected at its respective ends with the other holding-dog and with the said releasing-lever, all coöperating with the said holding-dogs to release the said holding-tooth from one holding-dog and permitting its locked engagement with the other holding-dog, and a spring-stop on said frame-section located between the said holding-dogs and adapted to be forced directly in the path of movement of the said holding-tooth for engagement therewith for a time exposure, substantially as and for the purposes set forth.

11. In a photographic shutter, the combination, with a chambered frame-section provided with a circular opening, a series of shutter-leaves assembled around said opening, each leaf having a pivotal center on an imaginary circle concentric with the circular opening in said frame-section, a movable ring with which said leaves are connected, said ring being concentrically arranged in relation to said circular opening, and a tooth on said ring, of a releasing-lever and a pair of oppositely-located holding-dogs with one of which the said tooth is normally in holding engagement, but is adapted to be brought in holding engagement with the other holding-dog when the releasing-lever is actuated, substantially as and for the purposes set forth.

12. In a photographic shutter, the combination, with a chambered frame-section provided with a circular opening, a series of shutter-leaves assembled around said opening, each leaf having a pivotal center on an imaginary circle concentric with the circular opening in said frame-section, a movable ring with which said leaves are connected, said ring being concentrically arranged in relation to said circular opening, and a tooth on said ring, of a releasing-lever and a pair of oppositely-located holding-dogs with one of which the said tooth is normally in holding engagement, but is adapted to be brought in holding engagement with the other holding-dog when the releasing-lever is actuated, and a spring-stop located between the said holding-dogs for arresting the movement of said tooth, substantially as and for the purposes set forth.

13. In a photographic shutter, the combination, with the shutter proper and a moving tooth, of a releasing-lever and a pair of oppositely-located holding-dogs with one of which the said tooth is normally in holding engagement, but is adapted to be brought in holding engagement with the other holding-dog when the releasing-lever is actuated, a spring 46 having a portion in engagement with one of said holding-dogs, and a spring-plate located between the said holding-dogs, a finger-piece on one end of said spring-plate, and a projection on said spring-plate adapted to be brought in frictional holding engagement with said spring 46 for forcing the said stop directly in the path of movement of the said moving tooth for engagement therewith for a time exposure, substantially as and for the purposes set forth.

14. In a photographic shutter, the combination, with the shutter proper and a moving tooth, of a pair of oppositely-located holding-dogs, a releasing-lever connected with one of said holding-dogs, a link connected at its respective ends with the other holding-dog and with a portion of said releasing-lever, the said moving tooth being normally in holding engagement with one of the said holding-dogs, but being adapted to be brought in holding engagement with the other holding-dog when said releasing-lever is actuated, substantially as and for the purposes set forth.

15. In a photographic shutter, the combination, with the shutter proper and a moving tooth, of a pair of oppositely-located holding-dogs, a releasing-lever connected with one of said holding-dogs, a link connected at its respective ends with the other holding-dog and with a portion of said releasing-lever, the said moving tooth being normally in holding engagement with one of the said holding-dogs, but being adapted to be brought in holding engagement with the other holding-dog when said releasing-lever is actuated, and a spring-stop located between the said holding-dogs for arresting the movement of said tooth, substantially as and for the purposes set forth.

16. In a photographic shutter, the combination, with the shutter proper and a moving tooth, of a pair of oppositely-located holding-dogs, a releasing-lever connected with one of said holding-dogs, a link connected at its respective ends with the other holding-dog and with a portion of said releasing-lever, the said moving tooth being normally in holding engagement with one of the said holding-dogs, but being adapted to be brought in holding engagement with the other holding-dog when said releasing-lever is actuated, a spring 46 having a portion in engagement with one of said holding-dogs, and a spring-plate located between the said holding-dogs, a finger-piece on one end of said spring-plate, and a projection on said spring-plate adapted to be brought in frictional holding engagement with said spring 46 for forcing the said stop directly in the path of movement of the said moving tooth for engagement therewith for a time exposure, substantially as and for the purposes set forth.

17. In a photographic shutter, the combination, with a frame-section provided with slots 22, of a number of shutter-leaves pivotally connected with the said frame-section, each leaf being provided with a slot 17, a ring slidably arranged upon the said frame-section, and posts 21 on said ring, said posts being movably arranged in the said slots 22 and 17, substantially as and for the purposes set forth.

18. In a photographic shutter, the combination, with a frame-section provided with slots 22, of a number of shutter-leaves pivotally connected with the said frame-section, each leaf being provided with a slot 17, a ring slidably arranged upon the said frame-section, posts 21 on said ring, said posts being movably arranged in the said slots 22 and 17, a pivoted arm 28, and a connecting-spring between the free end of said arm and a portion of said ring, substantially as and for the purposes set forth.

19. In a photographic shutter, the combination, with a frame-section provided with slots 22, of a number of shutter-leaves pivotally connected with the said frame-section, each leaf being provided with a slot 17, a ring slidably arranged upon the said frame-section, posts 21 on said ring, said posts being movably arranged in the said slots 22 and 17, a pivoted arm 28, a connecting-spring between the free end of said arm and a portion of said ring, and a releasing mechanism connected with said ring to retain said ring in its normally immovable position and cause said spring to actuate said ring when said releasing mechanism is actuated, substantially as and for the purposes set forth.

20. In a photographic shutter, the combination, with a frame-section provided with slots 22, of a number of shutter-leaves pivotally connected with the said frame-section, each leaf being provided with a slot 17, a ring slidably arranged upon the said frame-section, posts 21 on said ring, said posts being movably arranged in the said slots 22 and 17, a pivoted arm 28, a connecting-spring between the free end of said arm and a portion of said ring, and a releasing mechanism connected with said ring to retain said ring in its normally immovable position and cause said spring to actuate said ring when said releasing mechanism is actuated, consisting, essentially, of a holding-tooth extending laterally from the said ring, a pair of holding-dogs pivotally arranged upon said frame-section, with either of which the said holding-tooth can be successively brought in holding engagement, and a releasing-lever coöperating with the said holding-dogs for releasing the said holding-tooth from one holding-dog and permitting its locked engagement with the other holding-dog, substantially as and for the purposes set forth.

21. In a photographic shutter, the combination, with a frame-section having a central opening for exposure, of a number of pivoted shutter-leaves normally closing the said opening, said leaves having their pivotal centers on an imaginary circle concentric with the central opening in said frame-section, being arranged and constructed when moved, that the movement of the said leaves in the one direction across the said opening will open and then close said opening, and that the reverse movement of the said leaves will in like manner first open and then close the said opening, substantially as and for the purposes set forth.

22. In a photographic shutter, the combination, with a frame-section having a circular central opening for exposure, of a number of pivoted shutter-leaves 7, having their pivotal centers on an imaginary circle concentric with the central opening in said frame-section, each leaf being formed with a curved edge portion 16, and contiguous end portions or horns 7', all combined with means for actuating said leaves and causing them to successively open and close said central opening, when moving in either direction across said opening, substantially as and for the purposes set forth.

23. In a photographic shutter, the combination, with a frame-section having a circular opening for exposure, of a number of pivoted shutter-leaves 7, having their pivotal centers on an imaginary circle concentric with the central opening in said frame-section, each leaf being provided with a curved edge portion 16 and a pair of contiguous horns 7', all arranged and adapted to extend over a portion of the said opening, substantially as and for the purposes set forth.

In testimony that I claim the invention set forth above I have hereunto set my hand this 4th day of April, 1902.

GEORGE L. COURSEN.

Witnesses:
FREDK. C. FRAENTZEL,
GEO. D. RICHARDS.